United States Patent Office 2,705,232
Patented Mar. 29, 1955

2,705,232

TERNORCHOLANYLTHIAZOLES

Raymond M. Dodson, Park Ridge, Ill., assignor to G. D. Searle & Co., Chicago, Ill., a corporation of Illinois No Drawing. Application February 20, 1953,
Serial No. 338,131

12 Claims. (Cl. 260—239.5)

This invention relates to polycyclic thiazole derivatives, their acid addition salts, and processes for the production thereof. In particular, it relates to thiazole derivatives of the formula

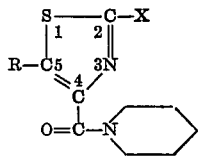

wherein R is a ternorcholanyl radical which may be hydroxylated or acetoxylated, and X is halogen or an amino or acyl-substituted amino radical.

The compounds of this invention are useful chemotherapeutic agents, especially because of their valuable regulatory effect on the cardiovascular system and their antihormonal activity. They are of particular importance as antihypertensive agents, being capable of reducing the elevated blood pressures characteristic of multiple disease states.

The cyclopentanopolyhydrophenanthrene radicals comprehended by R as defined in the foregoing general formula comprise those which may be regarded as derived from ternorcholane by displacement of a hydrogen at C20, and may be represented by the formula

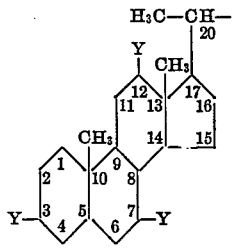

wherein Y may be hydrogen or a hydroxyl or acetoxyl group. R is thus seen to include such radicals as ternorcholanyl, ternorlithocholyl, 7-hydroxyternorcholanyl, 12-hydroxyternorcholanyl, ternorchenodesoxycholyl, ternordesoxycholyl, ternorisodesoxycholyl, and ternorcholyl, as well as 3-acetoxyternorcholanyl, 3,7-diacetoxyternorcholanyl, and 3,7,12-triacetoxyternorcholanyl. Other radicals within the meaning of R as hereinbefore defined will be apparent to those skilled in the art.

X, as defined in the general formula above, refers more particularly to the middle halogens, chlorine and bromine, to the unsubstituted amino radical, and to N-acetylamino, N-propionylamino, N-benzoylamino, and other like acyl-substituted amino radicals.

It follows from the foregoing formulae and definitions that among the substances comprising my invention are:

2-chloro - 5-(20 - ternorcholanyl)-thiazole - 4 - carboxy-piperidide, which has the formula

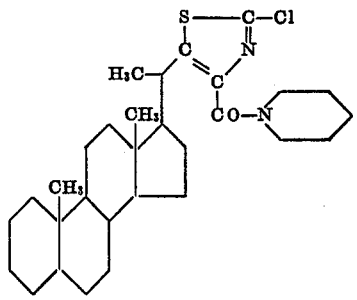

2 - bromo-5-(20-ternorcholyl)-thiazole-4-carboxypiperi-dide, which has the formula

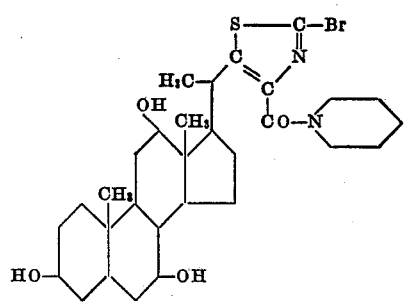

2 - amino-5-(20 - ternorcholanyl)-thiazole - 4 - carboxy-piperidide, which has the formula

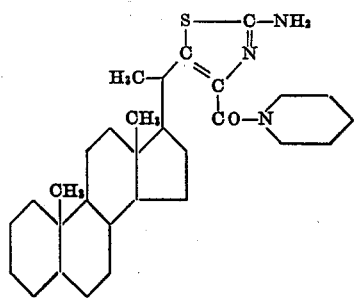

2-amino-5-(20-ternorlithocholyl)-thiazole - 4 - carboxy-piperidide hydrochloride, which has the formula

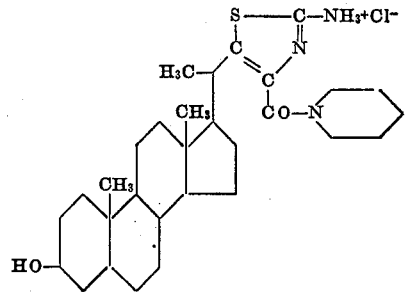

2-(N - acetylamino)- 5 -[20 -(3,7 - diacetoxyternorcholanyl)]-thiazole-4-carboxypiperidide, which has the formula

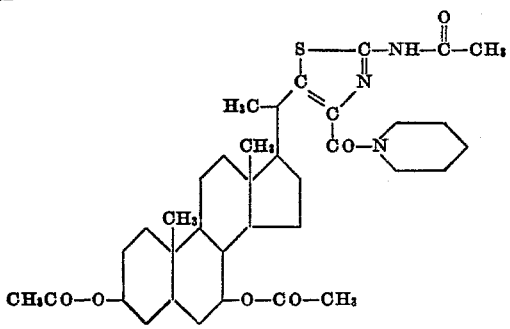

2-(N-benzoylamino)-5-(20-ternorcholanyl)-thiazole-4-carboxypiperidide, which has the formula

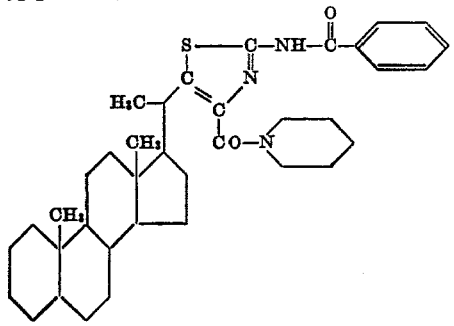

In the form of acid addition salts, these substances are soluble in dilute propylene glycol and may be administered parenterally. As free bases, they may be taken by mouth. Among the acids with which the unacylated amino compounds of this invention form addition salts are such inorganic and strong organic acids as sulfuric, phosphoric, hydrochloric, hydrobromic, sulfamic, citric, oxalic and ascorbic.

The compounds to which this invention relates may be prepared, starting with a cholanic acid halide—for example, the chloride—by condensing the acid halide with an amine, preferably a lower alkyl amine such as ethyl amine, in the presence of a substantially anhydrous, non-polar solvent, for example, diethyl ether, at temperatures ranging from −10 to +100° C., to give the corresponding N-alkylcholanamide. The amide may be halogenated at $C_{23}$ by reaction with phosphorous pentachloride or phosphorous pentabromide in benzene or other relatively inert, anhydrous, organic medium, at moderate temperatures which tend to vary inversely with the length of the heating time, 80° C. for half an hour being one efficacious combination of temperature and time. The α,α-dihalo-N-alkylcholanamide so obtained is subject to hydrolysis, as for example by dissolution in a solvent miscible with water—dioxane or the like—and treatment under 20 hour reflux with caustic potash. The two halogen atoms and the amido group are thereupon split off, resulting in an α-oxocholanic acid, which may, in turn, be converted to the piperidide by esterifying in conventional fashion, as with diazomethane, then condensing the ester thus produced with piperidine, preferably at reflux temperatures. The α-oxocholanic acid piperidide obtained at this point may next be halogenated, for example with bromine in carbon tetrachloride solution, yielding 22-halo-23-oxocholanic acid piperidide. Finally, this haloamide may be condensed with thiourea by refluxing in a lower alcohol for periods of time ranging upward of half an hour, three to twelve hours having been found optimal. The resultant 2-amino-5-(20-ternorcholanyl)-thiazole-4-carboxypiperidide, one of the compounds of this invention, may be purified by recrystallization from solvents such as methanol and benzene.

The corresponding thiazole derivatives wherein the ternorcholane portion of the molecule carries a hydroxyl or acetoxyl group at one or more of positions 3, 7, and 12, may be prepared by this same procedure, starting with the appropriately acetoxy-substituted cholanic acid halide, and taking care that said hydroxyl groups, if any, are protected—by esterification or the equivalent—during those steps of the synthesis which involve the use of phosphorous pentahalide and halogen, respectively. Thus, triacetoxycholanyl chloride may be condensed with ethyl amine to give triacetoxy-N-ethylcholanamide, which, in turn, may be treated with phosphorous pentachloride to yield acetoxydichloroethylcholanamide. The amide may be hydrolyzed with caustic potash to α-oxocholic acid, and the latter, after successive reesterification with acetic anhydride in glacial acetic acid and diazomethane, condensed with piperidine and finally reacetylated to give the triacetoxyoxocholanic acid piperidide. Bromination of this compound may be effected with bromine in anhydrous ether, and the 22-bromo derivative thus obtained condensed with thiourea to yield 2-amino-5-[20-(3,7,12-triacetoxycholanyl)]-thiazole-4-carboxypiperidide, another of the products of this invention.

The acetoxy derivatives may be readily converted to corresponding hydroxy compounds by selective saponification, for example, by letting stand overnight at room temperature with alcoholic potassium bicarbonate.

Simple admixture of an inorganic or strong organic acide with the unacylated amino compounds of this invention generally serves for the preparation of the addition salts thereof, although auxiliary heating may occasionally be advantageous.

The acyl derivatives of the aminothiazoles contemplated herein are readily available by interaction of the particular primary amine with the acid chloride or anhydride of choice, care being taken to protect, by preliminary esterification or other suitable means, any nuclear hydroxyl groups present.

The halothiazoles which comprise this invention may be obtained from the appropriate primary amine by reaction thereof with hydrohalic acid and butyl nitrite in acetic acid medium.

The following examples will illustrate in detail certain of the thiazole derivatives which constitute the present invention, and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed temperatures are given in degrees centigrade (° C.) and relative amounts of materials in parts by weight, except as otherwise noted.

In all structural formulas in the specification and claims, all cyclic structures represent saturated rings unless unsaturation is specifically indicated by double bonds.

*Example 1*

A. *N-ethylcholanamide.*—A suspension of 80 parts of cholanic acid in 1400 parts of anhydrous ether is treated with 128 parts of thionyl chloride and 1 part of pyridine. The resultant solution is thoroughly mixed and allowed to stand at approximately 25° C. for 3 hours. The reaction mixture is then evaporated under vacuum, and the residue freed from thionyl chloride by addition and evaporation of 1260 parts of dry benzene. The residue is next dissolved in 1400 parts of anhydrous ether; the solution is cooled to 5° C., then added to a cold (5° C.) solution of 100 parts of ethyl amine in 1400 parts of anhydrous ether. Gelation occurs. The reaction mixture is diluted with water and benzene, warmed to assist resolution of the gel, then separated into organic and aqueous phases. The organic phase is agitated with dilute sodium bicarbonate solution, then with water. Next it is dried over sodium sulfate and evaporated. The residue so obtained is difficult to crystallize, separating as a gel from most solvents. By gelation from a mixture of alcohol and water is obtained N-ethylcholanamide, M. P. 163.5–165.5° C. $[\alpha]_D^{25} = +25°$ (1% in chloroform).

B. *α,α-Dichloro-N-ethylcholanamide.*—A suspension of 10 parts of N-ethylcholanamide and 26 parts of phosphorous pentachloride in 27 parts of dry benzene is heated at about 70° C. for 30 minutes. The benzene is then evaporated in a stream of air, and ice is next cautiously added to decompose excess phosphorous pentachloride. Introduction of 120 parts of acetone, followed by 30-minute heating at reflux temperature produces a solution which, upon addition of small amounts of water to the point of cloudiness and subsequent cooling to 5° C., precipitates α,α-dichloro-N-ethylcholanamide. Upon crystallization from dilute methanol, the product shows M. P. 149–150° C., $[\alpha]_D^{25} = +36.5°$ (1% in chloroform).

C. *Methyl α-oxocholanate*.—A solution of 34 parts of α,α-dichloro-N-ethylcholanamide in 1600 parts of purified dioxane is refluxed with a solution of 25 parts of caustic potash in 800 parts of water for 20 hours. The reaction mixture is then diluted with a large volume of water and made acid with 96 parts of concentrated muriatic acid in 200 parts of water. The product so precipitated is filtered out and taken up in approximately 700 parts of benzene. The benzene solution is clarified by filtration, separated from a thin layer of water, and dried by azeotropically distilling off about one-third of the benzene present. The α-oxocholanic acid thus obtained in not isolated, but converted as is to the methyl ester by interaction with 4 parts of diazomethane dissolved in 100 parts of anhydrous ether. After 30 minutes, the reaction is terminated by evaporating off about two-thirds of the solvents present, whereupon an amount of petroleum ether equal in volume to that of the residue is added thereto. Chromatographic adsorption of the resultant solution on 160 parts of silica gel, followed by elution with 1:1 benzene-petroleum ether and then with benzene, gives, upon evaporation of the combined eluates and subsequent crystallization from methanol, methyl α-oxocholanate, M. P. 69–70° C.

D. *α-Oxocholanic acid piperidide*.—A solution of 39 parts of methyl α-oxocholanate in 172 parts of dry piperidine is heated under reflux for 2 hours. It is then poured into a mixture of ice and muriatic acid, and the product thus precipitated is crystallized from dilute alcohol. α-Oxocholanic acid piperidide results, which upon crystallization from dilute acetone, shows M. P. 147.5–148° C.

E. *22-bromo-23-oxocholanic acid piperidide*.—To 30 parts of α-oxocholanic acid piperidide is added 11 parts of bromine dissolved in carbon tetrachloride solution q. s. a molarity of 1. A relatively very small amount of anhydrous aluminum chloride is introduced to initiate the reaction, upon completion of which the carbon tetrachloride is removed in vacuo and the residue is crystallized from dilute acetone. There is obtained by this means 22-bromo-23-oxocholanic acid piperidide, M. P. 179.5–180.5° C.

F. *2-amino-5-(20-ternorcholanyl) - thiazole-4-carboxypiperidide*.—A solution of 65 parts of 22-bromo-23-oxocholanic acid piperidide and 19 parts of thiourea in 1380 parts of alcohol is heated under reflux for 5½ hours. The reaction mixture is then poured into water and made basic with ammonium hydroxide. The product so precipitated is separated by filtration and crystallized from a mixture of methanol and benzene. Further purification is achieved through the agency of the hydrochloride: The material is taken up in a mixture of benzene and ether, then treated with dilute hydrochloric acid to precipitate the addition salt. The hydrochloride is filtered out, washed thoroughly with water, and thereafter converted again to the base by dissolution in hot alcohol and addition to the solution of sufficient ammonium hydroxide to bring about faint alkalinity. The hot solution, upon dilution with water to the point of cloudiness, and subsequent cooling, precipitates 2-amino - 5 - (20 - ternorcholanyl)-thiazole - 4 - carboxypiperidine, M. P. 238–240° C. $[\alpha]_D^{25} = -7°$ (1% in chloroform).

*Example 2*

*2-chloro-5-(20-ternorcholanyl) - thiazole - 4 - carboxypiperidide*.—A solution of 14 parts of 2-amino-5-(20-ternorcholanyl)-thiazole-4-carboxypiperidide in 107 parts of glacial acetic acid and 121 parts of concentrated muriatic acid is treated at 15° C. with 46 parts of n-butyl nitrite. The reaction mixture is allowed to warm to 25° C. After ten minutes, a vigorous reaction ensues, following which the reactants are allowed to stand for about 2 hours, then poured into dilute ammonium hydroxide solution. Separation of semisolid material from an aqueous phase is effected by decantation of the latter. The aqueous phase is extracted with ether, the ether solution is evaporated, and the residue is combined with the semisolid material obtained above, in that order. Crystallization of the combined materials from a mixture of methanol and benzene gives 2-chloro-5-(20-ternorcholanyl)-thiazole-4-carboxypiperidide, M. P. 193–194.5° C.

*Example 3*

*2-(N-benzoylamino) - 5 - (20-ternorcholanyl)-thiazole-4-carboxypiperidide*.—To a solution of 1 part of 2-amino-5-(20-ternorcholanyl)-thiazole-4-carboxypiperidide in 16 parts of pyridine is cautiously added 20 parts of benzoyl chloride. The reaction mixture is allowed to stand for 2 hours, then poured into water. 2-(N-benzoylamino)-5-(20-ternorcholanyl)-thiazole-4-carboxypiperidide precipitates as an amorphous solid.

*Example 4*

A. *3-acetoxycholanyl chloride*.—A solution of 2 parts of lithocholic acid in 2 parts of glacial acetic acid and 3 parts of acetic anhydride is refluxed for 4 hours. Successive precipitation with water, extraction into ether, and stripping of the solvent, yields 3-acetoxy cholanic acid as the residue, which is converted according to the technique of Example 1A into the acid chloride by suspension in 35 parts of anhydrous ether and treatment for 3 hours at 25° C. with 3 parts of thionyl chloride and a trace of pyridine. Removal of the solvent in vacuo followed by addition and evaporation of 30 parts of dry benzene to drive off excess thionyl chloride gives the desired acid chloride.

B. *3-acetoxy-N-ethylcholanamide*.—To a solution of 10 parts of 3-acetoxycholanyl chloride in 175 parts of anhydrous ether is added at 5° C. a cold solution of 12 parts of ethyl amine in 175 parts of anhydrous ether. A gel is formed, which may be resolved upon dilution with benzene and water. The organic phase is separated off, washed with 5% aqueous sodium bicarbonate and then with water, dried over sodium sulfate, and finally evaporated in vacuo. The residue is 3-acetoxy-N-ethylcholanamide.

C. *3 - acetoxy-23,23-dichloro-N-ethylcholanamide*.—A mixture of 18 parts of 3-acetoxy-N-ethylcholanamide and 47 parts of phosphorus pentachloride in 50 parts of dry benzene is heated under reflux for 30 minutes. Solvent is thereupon removed by vacuum distillation, and excess phosphorus pentachloride then destroyed by cautious addition of ice. Sufficient acetone is introduced to bring insolubles into solution at reflux temperature, then water is added, in small increments, until the hot solution turns cloudy. On cooling, there is precipitated 3-acetoxy-23,23-dichloro-N-ethylcholanamide.

D. *Methyl 3-acetoxy-23-oxocholanate*.—Hydrolysis of the dichloroamide of Example 4C is effected by refluxing 12 parts of this material in 500 parts of peroxide-free dioxane with 8 parts of caustic potash in 250 parts of water. After 24 hours, the reaction mixture is diluted with 3000 parts of water, then made acid with 30 parts of muriatic acid in 50 parts of water. The precipitate so formed is separated off and extracted into warm benzene. After preliminary clarification of the benzene solution by filtration, a residual layer of water is drained away, and the benzene is then stripped in vacuo. The 3-hydroxy-23-oxocholanic acid thus obtained is partially esterified by introduction of 20 parts of glacial acetic acid and 30 parts of acetic anhydride, followed by 5 hours reflux. The part-ester is precipitated by pouring into water, after which it is, successsively, taken up in benzene, dried over sodium sulfate, filtered, and sufficient benzene distilled off to complete the drying process. A solution of 2 parts of diazomethane in 50 parts of anhydrous ether is next added, to complete the esterification; and the reaction initiated thereby is terminated after 1 hour by evaporation of about two-thirds of the solvents present. An amount of petroleum ether equal to volume to that of the residue is then added, and the product chromatographed on silica gel according to the technique of Example 4C. Methyl 3-acetoxy-23-oxocholanate is obtained on evaporation of the benzene and benzene-petroleum ether eluates.

E. *3-acetoxy-23-oxocholanic acid piperidide*.—A solution consisting of 26 parts of methyl 3-acetoxy-23-oxocholanate in 115 parts of dry piperidine is refluxed for 3 hours, then poured into a mixture of ice and muriatic acid. The piperidide thereupon thrown out of solution is filtered off, recovered on a funnel and refluxed 2½ hours, with 30 parts of glacial acetic acid and 45 parts of acetic anhydride to insure complete acetylation.

F. *3-acetoxy-22-bromo-23-oxocholanic acid piperidide*.—Halogenation of the amide of Example 4E is accomplished by adding to 19 parts thereof, 6.3 parts of bromine in 63 parts of carbon tetrachloride. A trace of anhydrous aluminum chloride serves to start the reaction. When halogenation is complete, the solvent is stripped in vacuo;

and the residue is then precipitated, as above, from aqueous acetone. 3-acetoxy-22-bromo-23-oxocholanic acid piperidide comes out in good yield.

G. *5-[20-(3-acetoxyternorcholanyl)]-2-amino-thiazole-4-carboxypiperidide.*—A mixture of 15 parts of 3-acetoxy-22-bromo-23-oxocholanic acid piperidide and 4 parts of thiourea is heated together in 290 parts of ethanol under reflux for 5 hours. The reaction mixture is poured into water at this point, then made alkaline with ammonium hydroxide. The product thus precipitated is recovered on a filter and pressed as dry as possible after which it is dissolved in a mixture of benzene and ether. Dilute hydrochloric acid is added to throw down the hydrochloride, which is, in turn, filtered, washed with water, dissolved in alcohol, and treated with enough ammonium hydroxide to convert it again to the base. The hot, slightly ammoniacal solution, diluted with water to the point of cloudiness, precipitates the desired product upon cooling.

H. *2 - amino - 5 - (20 - ternorlithocholyl) - thiazole-4-carboxypiperidide hydrochloride.*—The acetoxy compound of Example 4G is subject to saponification as follows: A solution of 60 parts of the ester in 900 parts of alcohol is allowed to stand overnight at 25° C. with 6 parts of caustic potash in 25 parts alcohol. The hydrolysate is poured into water. The product thus precipitated is recovered, washed and finally pressed dry on a filter. The material is taken up in a mixture of benzene and ether, then converted to the hydrochloride by addition of an excess of dilute hydrochloric acid. The hydrochloride is filtered out, washed with water, and finally precipitated from alcohol to give 2-amino-5-(20-ternorlithocholyl)-thiazole-4-carboxypiperidide hydrochloride.

*Example 5*

*2 - bromo - 5 - (20 - ternorcholyl) - thiazole - 4 - carboxypiperidide.*—3,7,12-triacetoxycholanic acid is prepared by interaction of 6 parts of cholic acid, 6 parts of acetic acid, and 9 parts of acetic anhydride, at reflux temperature for 5 hours. The ester is converted to the acid chloride by treating 10 parts thereof in 175 parts of anhydrous ether with 16 parts of thionyl chloride and a trace of pyridine for 3 hours at 25° C. according to the technique of Example 1A. Condensation of 5 parts of the resultant acid chloride with 8 parts of methyl amine in 100 parts of anhydrous ether is effected at −10° C. by the procedure of Example 4B, yielding the acetoxyamide. From this is obtained 23,23-dibromo-3,7,12-triacetoxy-N-methylcholanamide by admixture with phosphorous pentabromide in benzene solution at 65° C. for 1 hour, using 2 parts of starting amide and 10 parts of phosphorous pentabromide. Hydrolysis of the bromoamide is is effected by refluxing 4 parts thereof in 200 parts of dioxane with 2 parts of caustic soda in 100 parts of water, according to the procedure of Example 4D. The nuclear hydroxyls of the 23-oxocholic acid thus obtained are reesterified with 6 parts of acetic acid and 9 parts of acetic anhydride at steam bath temperatures for 6 hours, after which the carboxyl group is esterified with 1 part of diazomethane in 25 parts of anhydrous ether. Chromatographic adsorption on silica gel serves to purify the resultant product for isolation. Conversion to the piperidide is effected by heating 8 parts of methyl 23-oxo-3,7,12-triacetoxycholanate with 24 parts of dry piperidine at 90° C. for 4 hours, the product being refluxed for 3 hours with an equal weight of glacial acetic acid and 1½ parts of acetic anhydride to assure complete acetylation. The piperidide is brominated in carbon tetrachloride medium, using 3 parts of bromine and 30 parts of solvent for 12 parts of the amide. Condensation of 9 parts of the 22-bromo-23-oxo-3,7,12-triacetoxycholanic acid piperidide so produced with 2 parts of thiourea in 150 parts of isopropyl alcohol at 85° C. for 8 hours yields the thiazole derivative, which, upon reacting with 65 parts of 48% hydrobromic acid and 15 parts of butyl nitrite in 35 parts of acetic acid, gives, from 6 parts of 2-amino-5-[20-(3,7,12 - triacetoxyternorcholanyl)] - thiazole - 4 - carboxypiperidide, the corresponding 2-bromo compound. The latter is selectively hydrolyzed to the desired 2-bromo - 5 - (20 - ternorcholyl) - thiazole - 4 - carboxypiperidide by interaction of 11 parts of potassium bicarbonate dissolved in 100 parts of water, with 24 parts of the acetoxy compound in 400 parts of methanol, on standing at 25° C. overnight.

*Example 6*

*2 - (N - acetylamino) - 5 - [20 - (3,7 - diacetoxyternorcholanyl) ]-thiazole-4-carboxypiperidide.*—A mixture of 10 parts of chenodesoxycholic acid, 12 parts of glacial acetic acid and 18 parts of acetic anhydride is refluxed for 5 hours. From 8 parts of the ester thus prepared, on standing 4 hours at 25° C. with 12 parts of thionyl chloride and a trace of pyridine in 150 parts of anhydrous ether, the ester acid chloride is obtained. A 1:50 mixture of 13 parts of this acid chloride in chloroform is reacted with 15 parts of ethyl amine at 25° C. for 8 hours to produce 3,7-diacetoxy-N-ethylcholanamide. The ester amide, in turn, is halogenated with phosphorous pentachloride to give 23,23-dichloro-3,7-diacetoxy-N-ethylcholanamide, using 6 parts of amide, 13 parts of phosphorous pentachloride and 27 parts of carbon tetrachloride according to the procedure of Example 4C. The chlorine atoms are split off by refluxing 7 parts of the amide in a solution of 4 parts of caustic potash in 900 parts of 75% n-propyl alcohol for 26 hours. The 23-oxochenodesoxycholic acid thus obtained is treated with 10 parts of glacial acetic acid and 15 parts of acetic anhydride for 5 hours at reflux temperatures in order to esterify the nuclear hydroxyls, after which, following the technique of Example 4D, a solution of 2 parts of diazomethane in 50 parts of anhydrous ether serves to esterify the carboxyl group. Condensation with piperidine is effected by refluxing 3 parts of the ester with 10 parts of the amine for 2½ hours, after which reesterification is carried out as in Example 4E, using 1 part of glacial acetic acid and 1½ parts acetic anhydride for each part of the piperidide. The 3,7-diacetoxy-23-oxocarboxypiperidide so produced is halogenated by interaction with a solution of 1 part of bromine in 200 parts of anhydrous ether for each 7 parts of amide, using aluminum chloride as a catalyst. Next, 8 parts of the bromopiperidide is reacted for 6 hours at 80° C. with 2 parts of thiourea in 140 parts of ethyl alcohol to form 5-[20-(3,7-diacetoxyternorcholanyl)]-thiazole-4-carboxypiperidide. Finally, acetylation is accomplished by mixing together 4 parts of the foregoing thiazole compound with 65 parts each of pyridine and acetic anhydride, and letting stand for 3 hours at 25° C. The desired 2-(N-acetylamino)-5-[20-(3,7 - diacetoxyternorcholanyl)] - thiazole - 4 - carboxypiperidide so prepared may be purified by precipitation from a mixture of benzene and methanol.

I claim:

1. A member of the group consisting of ternorcholanylthiazole compounds of the formula

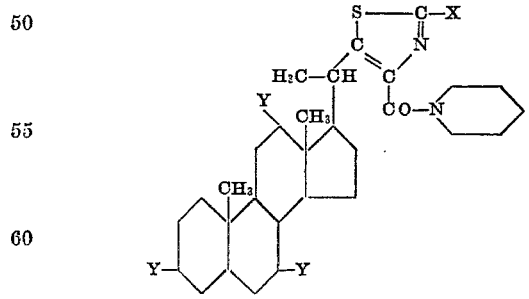

wherein X is a member of the group consisting of halogens, the amino radical, the amino radical in the form of its acid addition salts, lower alkanoyl-substituted amino radicals, and the benzoylamino radical; and Y is a member of the group consisting of hydrogen, and the hydroxyl and acetoxyl radicals.

2. A ternorcholanylthiazole of the formula

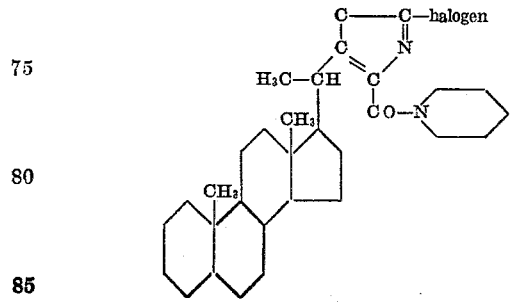

3. 2-chloro-5-(20-ternorcholanyl)-thiazole-4-carboxy-piperidide, having the formula

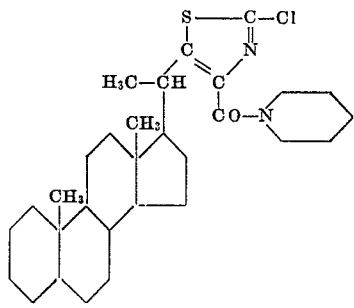

4. 2-amino-5-(20-ternorcholanyl)-thiazole-4-carboxy-piperidide, having the formula

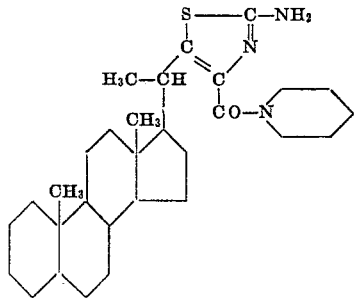

5. A ternorcholanylthiazole of the formula

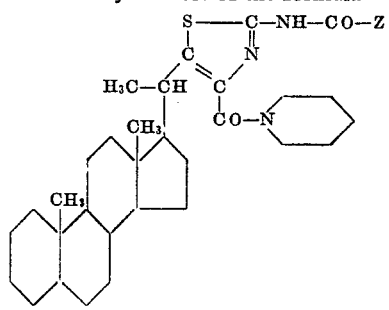

wherein Z is lower alkyl.

6. 2 - (N - benzoylamino) - 5 - (20 - ternorcholanyl)- thiazole-4-carboxypiperidide, having the formula

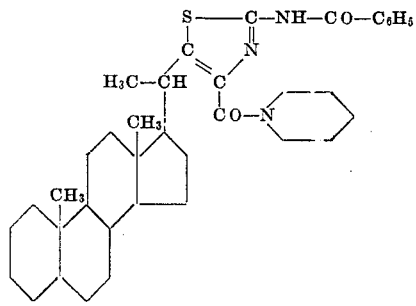

7. A ternorcholylthiazole of the formula

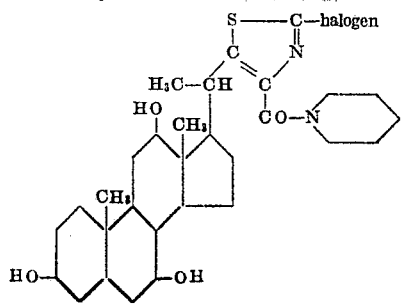

8. 2 - bromo - 5 - (20 - ternorcholyl) - thiazole - 4- carboxylpiperidide, having the formula

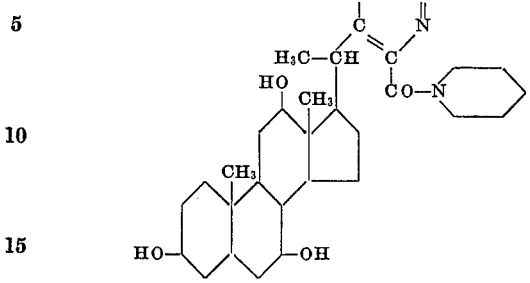

9. 2 - (N - acetylamino) - 5 - [20 - (3,7 - diacetoxy-ternorcholanyl)] - thiazole - 4 - carboxypiperidide, having the formula

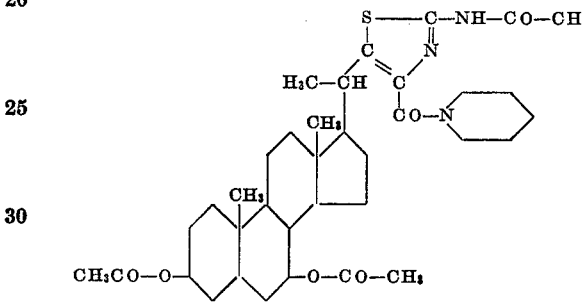

10. In a process for preparing a compound selected from the group consisting of ternorcholanylthiazoles of the formula

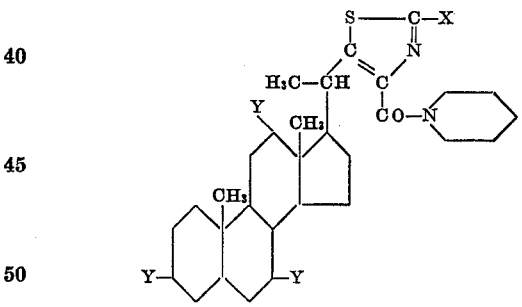

wherein X is a member of the group consisting of halogens, the amino radical, the amino radical in the form of its acid addition salts, lower alkanoyl-substituted amino radicals, and the benzoylamino radical; and Y is a member of the group consisting of hydrogen, and the hydroxyl and acetoxyl radicals, the steps which comprise halogenating a cholanic acid lower alkamide with phosphorous pentahalide in an inert, anhydrous, organic solvent at moderate temperatures to produce the corresponding 23,23-dihalo derivative, hydrolyzing said dihalo compound in alkaline media to produce the 23-oxo-cholanic acid, and isolating these products.

11. The process as in claim 10, wherein the phosphorous pentahalide halogenating agent is phosphorous pentachloride.

12. The process as in claim 10, wherein the hydrolytic medium is caustic potash dissolved in dioxane.

References Cited in the file of this patent

Liberman: J. Amer. Chem. Soc., pp. 3094–7, September 1948.